Dec. 29, 1953    A. COTSWORTH III    2,664,464

AUTOMATIC FREQUENCY CONTROL CIRCUIT FOR TELEVISION RECEIVERS

Filed June 28, 1951

*INVENTOR.*

Albert Cotsworth III

BY Francis W. Crotty

ATTORNEY.

Patented Dec. 29, 1953

2,664,464

UNITED STATES PATENT OFFICE 2,664,464

AUTOMATIC FREQUENCY CONTROL CIRCUIT FOR TELEVISION RECEIVERS

Albert Cotsworth III, Oak Park, Ill., assignor to Zenith Radio Corporation, a corporation of Illinois Application June 28, 1951, Serial No. 234,000

5 Claims. (Cl. 178—5.8)

This invention relates to television receivers and more particularly to an improved automatic-frequency control (AFC) circuit for use in television receivers of the intercarrier-sound type.

Prior to the advent of present-day intercarrier-sound television receivers, the construction and design of a heterodyne oscillator with sufficient frequency stability for proper operation of the receiver presented a serious problem. The problem arose from the fact that separation of the video and sound components of an incoming television signal into their respective intermediate-frequency channels was dependent upon the frequency of the heterodyne oscillator and it was necessary for this frequency to be rigidly maintained at a prescribed value. As is well known, intercarrier-sound television receivers utilize but a single intermediate-frequency channel for both the frequency-modulated sound and amplitude-modulated video carriers of the received television signal, separation between the video and sound components being effected by a heterodyne action between these carriers in the second detector which produces an intercarrier-signal frequency-modulated with the sound components. In such receivers, the separation between the video and sound components is achieved independently of the frequency of the heterodyne oscillation, and the frequency-stability requirements of the oscillator are not as rigorous as in the first-mentioned types of receivers.

The construction of heterodyne oscillators having sufficient frequency stability for use in intercarrier sound television receivers is no particular problem when such receivers are operated in the frequency bands presently allotted to television signals. However, in the event that the television signal band is shifted to a higher position in the frequency spectrum, as is contemplated, the problem of frequency stability in the heterodyne oscillator again comes to the forefront even in television receivers of the intercarrier-sound type. This is because of the extremely high radio- and heterodyne-frequencies involved when receivers are operated in the contemplated frequency band wherein a small percentage variation in the operating frequency of the heterodyne oscillator reflects a material frequency change in the intermediate-frequency signal of the receiver.

To eliminate the necessity of manual adjustment it is desirable, even when operating in the current frequency bands, for an intercarrier-sound television receiver to include a network for automatically controlling the frequency of the heterodyne oscillator to compensate any tendency toward drift. However, such a network may well be proved essential to a receiver for operation in the contemplated high-frequency band. It has been common practice, when operating receivers with separate sound and video intermediate-frequency channels, to derive for AFC purposes a control signal from the sound discriminator-detector. This was convenient and possible since any shift in the center frequency of the sound carrier applied to the discriminator represents a related shift in the operating frequency of the heterodyne oscillator. However, in intercarrier-sound receivers the frequency of the signal applied to the sound detector is in no way related to the frequency of the heterodyne oscillator since it is merely a beat product of the video and sound carriers and has a center frequency determined solely by the frequency separation of these carriers. For this reason, the sound detector of an intercarrier-sound receiver is not an appropriate source of AFC potential.

An obvious expedient for the derivation of an AFC control potential would be to provide a separate discriminator circuit coupled to the intermediate-frequency amplifier for providing a control signal having amplitude variations related to frequency shifts of either the sound or video carriers as translated through this amplifier. In such a case, the frequency shifts are due to variations in the frequency of the heterodyne oscillator and, therefore, the control signal may be used for AFC purposes. However, such an arrangement entails the inclusion of relatively expensive additional components and circuitry in the receiver and has been found to be impractical from a commercial standpoint.

It is, accordingly, an object of the present invention to provide an improved AFC circuit for an intercarrier-sound television receiver to maintain the frequency of the heterodyne oscillator at a preselected value.

A further object of the invention is to provide an improved AFC circuit for an intercarrier-sound television receiver that requires a minimum of relatively inexpensive components and, therefore, may be constructed cheaply and conveniently.

In accordance with the invention the intermediate-frequency amplifier of a television receiver exhibits a sloping frequency-response characteristic at the frequency of the intermediate-frequency sound carrier. This characteristic produces amplitude changes in the sound carrier whenever its frequency shifts due to variations in the heterodyne oscillator frequency, and such amplitude changes are reflected in the intercarrier signal derived at the second detector. The invention comprises a rectifier coupled to the frequency-selective circuit utilized to derive the intercarrier signal from the second detector for application to the sound channel. The rectifier produces a unidirectional control potential having amplitude variations related to amplitude variations in the intercarrier signal which, in turn, are indicative of frequency variations in the heterodyne oscillator. A variable reactance unit, preferably of the thermally controlled type, is coupled to the frequency-determining circuit of the heterodyne oscillator, and is controlled by the potential developed in the rectifier to present an effective reactance in accordance with the amplitude of the controlling potential. In this manner, the frequency of the heterodyne oscillator is controlled so that any tendency for it to vary from a selected value is compensated.

The features of this invention which are believed to be new are set forth with particularity in the appended claims. The invention itself, however, together with further objects and advantages thereof may best be understood by reference to the following description when taken in conjunction with the accompanying drawing, in which:

Figures 1, 2, 3:
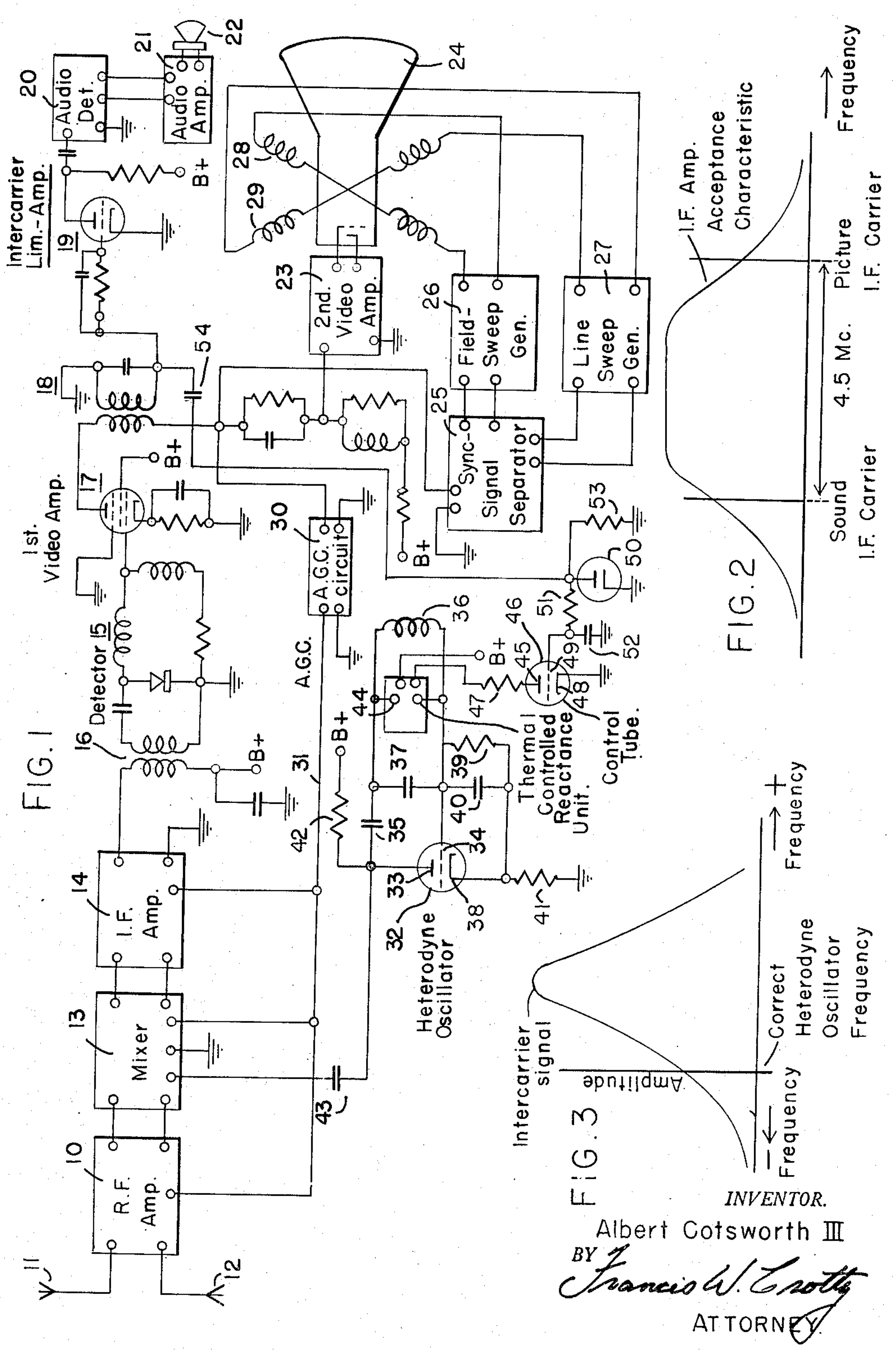
Figure 1 shows a television receiver incorporating the invention.
Figure 2 is a curve representing the frequency response characteristic of the intermediate-frequency amplifier of the receiver of Figure 1, and, Figure 3 is a curve indicating the relation between the amplitude of the intercarrier signal and the frequency of the heterodyne oscillator.

The television receiver illustrated in Figure 1 includes a radio-frequency amplifier 10 having input terminals connected to a suitable antenna 11, 12 and output terminals connected to a mixer amplifier 13. Mixer amplifier 13 is connected to an intermediate-frequency amplifier 14 which, in turn, is connected to a picture detector 15 through a usual coupling transformer 16. Detector 15 is connected in well-known manner to a first video amplifier 17 and this amplifier is connected through a frequency-selective network 18 to an intercarrier limiter-amplifier stage 19. Limiter 19 is coupled to an audio detector 20 of the usual frequency-discriminator type, and the output terminals of detector 20 are connected through an audio amplifier 21 to a sound reproducing device 22.

First video amplifier 17 is further coupled to a second video amplifier 23, the output terminals of the latter amplifier being connected to the input electrodes of an image-reproducing device 24. First video amplifier 17 is also connected through a synchronizing-signal separator 25 to a field-sweep generator 26 and to a line-sweep generator 27, these generators being connected respectively to the field- and line-deflection elements 28, 29 of reproducing device 24. An automatic-gain-control circuit 30 has input terminals connected to video amplifier 17 and output terminals connected to stages 10, 13 and 14 of the receiver, the latter connections being made by means of lead 31.

The receiver as thus far described is well known to the art, and its operation briefly is as follows: An incoming television signal intercepted by antenna 11, 12 is amplified in radio-frequency amplifier 10 and heterodyned to the selected intermediate frequency of the receiver by mixer 13. The frequency-response characteristic of the intermediate-frequency amplifier 14 is shown in Figure 2, and this amplifier translates both the picture and sound intermediate-frequency carriers of the received television signal in accordance with the intercarrier-sound principles. The video information is amplitude modulated on the video carrier and the sound information is frequency-modulated on the sound carrier.

The amplified intermediate-frequency signal is applied to detector 15 wherein the video components are detected, and the video and sound carriers are heterodyned together to produce an intercarrier signal frequency-modulated with the sound components which, by present-day standards, has a center frequency of 4.5 megacycles. The output signals of detector 15 are applied to video amplifier 17 wherein they are amplified, the frequency-modulated intercarrier signal being derived by means of frequency-selective network 18, and the detected video components being applied to video amplifier 23. The frequency-modulated intercarrier signal is amplitude-limited in limiter 19; and the sound components are recovered in detector 20, amplified in amplifier 21 and reproduced by reproducing device 22. The amplified video components from amplifier 23 are impressed on the input electrodes of reproducing device 24 and control the intensity of the cathode-ray beam therein in well-known fashion. The synchronizing components of the video signal are separated out by separator 25 and used to control the operation of generators 26, 27 and, therefore, the field- and line-deflection of the cathode-ray beam of device 24. The automatic-gain-control circuit 30 functions in well-known manner to produce a control signal, related to the intensity of the detected video signal, to control the gain of the high-frequency stages 10, 13 and 14 to maintain the input signal to detector 15 within a narrow range for a wide range of received signal intensities. In this manner, the image intelligence of the received television signal is reproduced by device 24, and the sound intelligence thereof is reproduced by device 22.

The heterodyne oscillator of the receiver comprises an electron-discharge device 32 having an anode 33 coupled to its control electrode 34 through a capacitor 35 and a frequency-determining network comprising an inductance coil 36 and a shunt capacitor 37. Control electrode 34 is connected to the cathode 38 of device 32 through a network comprising a resistor 39 and a shunt capacitor 40, cathode 38 being connected to ground through a resistor 41. Anode 33 is connected to the positive terminal B+ of a source of unidirectional potential through an isolating resistor 42, and is coupled to mixer amplifier 13 through a capacitor 43. The circuit of the heterodyne oscillator is well known, per se and may have any known form. This oscillator supplies a heterodyne signal to mixer 13, and the purpose of the present invention is to provide a suitable automatic-frequency control for maintaining the frequency of this heterodyne signal at a prescribed value.

In accordance with the invention, a reactance unit 44 is connected in circuit with the frequency-determining network 36, 37 of the heterodyne oscillator. The unit is preferably of the thermally controlled type which exhibits a variable reactance as the current flow through a thermal element included therein is varied. Thermal controlled reactance units are well-known to the art and a detailed description of the construction thereof is deemed to be unnecessary. The unit may be of the capacitive type, in which case it is connected in shunt with frequency-determining circuit 36, 37, as shown; or it may be of the inductive type, in which case it would preferably be connected in series with the frequency-determining circuit. Moreover, although a thermally controlled reactance unit is preferred, any other known type of controllable reactance unit may be used. The thermal element of unit 44 is connected in series with the positive terminal B+ of a source of unidirectional potential and the anode 45 of a control tube 46, a limiting resistor 47 also being included in the anode circuit. The cathode 48 of control tube 46 is connected to ground, and the control electrode 49 of this tube is connected to the anode of a diode 50 through a filter network comprising a series resistor 51 connected to ground through a capacitor 52. The cathode of diode 50 is connected to ground and the anode of the diode is connected to ground through a resistor 53 and is coupled to frequency-selective network 18 through a coupling capacitor 54.

Examination of Figure 2 reveals that any shift in the frequency of the heterodyne oscillator causes the frequency of the picture and sound intermediate-frequency carriers to change a corresponding amount. For example, an increase in the heterodyne frequency increases the frequencies of the intermediate-frequency carriers. Any such increase in frequency of the picture carrier causes a decrease in its amplitude due to the sloping characteristic of the intermediate-frequency response curve, but causes an increase in amplitude of the sound intermediate-frequency carrier. The decreased amplitude of the picture carrier causes AGC circuit 30 to increase the gain of the receiver, tending further to increase the amplitude of the sound intermediate-frequency carrier. As previously stated, changes in amplitude of the sound carrier are reflected in the amplitude of the intercarrier signal derived by frequency-selective circuit 18, this signal being rectified by diode 50 to produce across resistor 53 a unidirectional control potential having amplitude variations related in magnitude and sense to amplitude variations of the intercarrier signal from a reference value prevailing when the frequency of the heterodyne oscillator has its correct value. Network 51, 52 is a filter provided so that the AFC circuit does not respond to the rapid amplitude changes of the sound intermediate-frequency carrier due to its frequency modulation. Accordingly, the variations in the control potential applied to control electrode 49 of tube 46 are related solely to variations in the amplitude in the sound carrier caused by frequency variations of the heterodyne oscillator. Should the amplitude of the control potential increase, due to an increase in the frequency of the heterodyne oscillator, the space current flowing through device 46 and, therefore, the current through the thermal element of reactance unit 44 decreases. This modifies the effective reactance of device 44 and the resonant frequency of the frequency-determining network 36, 37 to produce a compensating change in the frequency of the heterodyne oscillator and restore it to its desired value. On the other hand, should the frequency of the heterodyne oscillator decrease from its proper value, the control potential developed by diode 50 decreases to provide a compensating increase in the frequency of the heterodyne oscillator. Since the amplitude of the intermediate-frequency picture carrier of all received television signals is maintained substantially constant by the AGC circuit, and since the Federal Communications Commission has prescribed a fixed, standard ratio between the picture and sound carriers in a television signal; the sound carrier translated by the intermediate-frequency amplifier has a fixed amplitude for all received television signals, and any variation in this amplitude (apart from that due to the modulation components) indicates a shift in frequency of the heterodyne oscillator. For this reason, an accurate control may be maintained on this oscillator, in accordance with the present invention, for all television signals to which the receiver may be tuned.

It is desirable that the frequency control of the heterodyne oscillator be effected by means of a thermally controlled reactance unit since such a unit provides a relatively wide pull-in range for the AFC circuit without rendering the oscillator inherently unstable, as is sometimes the case with many other types of reactance units. It is a simple matter to design the thermally controlled reactance unit so that it has a relatively high temperature coefficient to provide a sufficiently wide pull-in range for all practical purposes.

The invention provides, therefore, an improved automatic-frequency control circuit for use in an intercarrier-sound television receiver to provide a precise control for the heterodyne oscillator to maintain its frequency at a selected value with a high degree of stability. The AFC circuit of the invention is highly efficient in operation, yet is simple to construct and requires a minimum of inexpensive components.

While a particular embodiment of the invention has been shown and described, modifications may be made and it is intended in the appended claims to cover all such modifications as may fall within the true spirit and scope of the invention.

I claim:

1. An intercarrier sound television receiver for utilizing a picture carrier amplitude modulated with video information and for concurrently utilizing a sound carrier having a fixed frequency separation from said picture carrier and frequency modulated with sound information, said receiver comprising: a first detector including a tunable heterodyning oscillator for converting said carriers to intermediate-frequency picture and sound signals; an intermediate-frequency channel coupled to said first detector and presenting a sloping frequency-response characteristic to said sound signal; a second detector coupled to said channel for deriving an intercarrier signal of fixed frequency from said picture and sound signals; a frequency-selective rectifier circuit coupled to said second detector for selecting and rectifying said intercarrier signal; a filter circuit coupled to said rectifier to derive therefrom a control potential substantially independent of said sound information and having amplitude variations representing frequency variations of said heterodyning oscillator from a reference frequency; and means responsive to said control potential for compensating said frequency variations.

2. An intercarrier sound television receiver for utilizing a picture carrier amplitude modulated with video information and for concurrently utilizing a sound carrier having a fixed frequency separation from said picture carrier and frequency modulated with sound information, said receiver comprising: a first detector including a tunable heterodyning oscillator for converting said carriers to intermediate-frequency picture and sound signals; an intermediate-frequency channel coupled to said first detector and presenting a sloping frequency-response characteristic to said sound signal; a second detector coupled to said channel for deriving an intercarrier signal of fixed frequency from said picture and sound signals; a frequency-selective rectifier circuit coupled to said second detector for selecting and rectifying said intercarrier signal; a filter circuit coupled to said rectifier to derive therefrom a control potential substantially independent of said sound information and having amplitude variations representing frequency variations of said heterodyning oscillator from a reference frequency; and means, including a reactance unit coupled to said heterodyning oscillator, responsive to said control potential for compensating said frequency variations.

3. An intercarrier sound television receiver for utilizing a picture carrier amplitude modulated with video information and for concurrently utilizing a sound carrier having a fixed frequency separation from said picture carrier and frequency modulated with sound information, said receiver comprising: a first detector including a tunable heterodyning oscillator for converting said carriers to intermediate-frequency picture and sound signals; an intermediate-frequency channel coupled to said first detector and presenting a sloping frequency-response characteristic to said sound signal; a second detector coupled to said channel for deriving an intercarrier signal of fixed frequency from said picture and sound signals; a frequency-selective rectifier circuit coupled to said second detector for selecting and rectifying said intercarrier signal; a filter circuit coupled to said rectifier to derive therefrom a control potential substantially independent of said sound information and having amplitude variations representing frequency variations of said heterodyning oscillator from a reference frequency; a thermally controlled reactance unit coupled to said heterodyning oscillator for controlling the operating frequency thereof; and means responsive to said control potential for controlling said reactance unit to compensate and frequency variations of said heterodyning oscillator.

4. An intercarrier sound television receiver for utilizing a picture carrier amplitude modulated with video information and for concurrently utilizing a sound carrier having a fixed frequency separation from said picture carrier and frequency modulated with sound information, said receiver comprising: a first detector including a tunable heterodyning oscillator for converting said carriers to intermediate-frequency picture and sound signals; an intermediate-frequency channel coupled to said first detector and presenting a sloping frequency-response characteristic to said sound signal; a second detector coupled to said channel for deriving an intercarrier signal of fixed frequency from said picture and sound signals; a sound channel coupled to said second detector for selecting said intercarrier signal; a rectifier circuit coupled to said sound channel for rectifying said intercarrier signal; a filter circuit coupled to said rectifier to derive therefrom a control potential substantially independent of said sound information and having amplitude variations representing frequency variations of said heterodyning oscillator from a reference frequency; and means responsive to said control potential for compensating said frequency variations.

5. An intercarrier sound television receiver for utilizing a picture carrier amplitude modulated with video information and for concurrently utilizing a sound carrier having a fixed frequency separation from said picture carrier and frequency modulated with sound information, said receiver comprising: a first detector including a tunable heterodyning oscillator for converting said carriers to intermediate-frequency picture and sound signals; an intermediate-frequency channel coupled to said first detector and presenting a sloping frequency-response characteristic to said sound signal; a second detector coupled to said channel for deriving an intercarrier signal of fixed frequency from said picture and sound signals; an automatic-gain-control circuit coupled to said second detector for controlling the gain of said intermediate-frequency channel in accordance with the intensity of said picture signal; a sound channel coupled to said second detector for selecting said intercarrier signal; a rectifier circuit coupled to said sound channel for rectifying said intercarrier signal; a filter circuit coupled to said rectifier to derive therefrom a control potential substantially independent of said sound information and having amplitude variations representing frequency variations of said heterodyning oscillator from a reference frequency; a thermally controlled reactance unit coupled to said heterodyning oscillator for controlling the operating frequency thereof; and means responsive to said control potential for controlling said reactance unit to compensate said frequency variations of said heterodyning oscillator.

ALBERT COTSWORTH III.

References Cited in the file of this patent

UNITED STATES PATENTS

| Number | Name | Date |
|---|---|---|
| 2,552,140 | Boothroyd | May 8, 1951 |
| 2,553,368 | Breen | May 15, 1951 |